United States Patent
Rice

(10) Patent No.: US 9,915,149 B2
(45) Date of Patent: Mar. 13, 2018

(54) SYSTEM AND METHOD FOR A FLUIDIC BARRIER ON THE LOW PRESSURE SIDE OF A FAN BLADE

(71) Applicant: Rolls Royce North American Technologies Inc, Indianapolis, IN (US)

(72) Inventor: Edward C. Rice, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 376 days.

(21) Appl. No.: 14/837,942

(22) Filed: Aug. 27, 2015

(65) Prior Publication Data

US 2017/0058676 A1    Mar. 2, 2017

(51) Int. Cl.
| | |
|---|---|
| F01D 5/14 | (2006.01) |
| F02K 3/06 | (2006.01) |
| F01D 5/18 | (2006.01) |
| F01D 11/10 | (2006.01) |
| F01D 25/24 | (2006.01) |
| F01D 11/04 | (2006.01) |
| F02K 3/075 | (2006.01) |

(52) U.S. Cl.
CPC ............... *F01D 5/145* (2013.01); *F01D 5/18* (2013.01); *F01D 11/04* (2013.01); *F01D 11/10* (2013.01); *F01D 25/24* (2013.01); *F02K 3/06* (2013.01); *F02K 3/075* (2013.01); *F05D 2220/36* (2013.01); *F05D 2240/12* (2013.01); *F05D 2240/127* (2013.01)

(58) Field of Classification Search
CPC . F01D 5/145; F01D 5/146; F01D 5/18; F01D 5/183; F01D 11/04; F01D 11/10; F01D 25/24; F01D 1/023; F02K 3/06; F02K 3/075; F05D 2220/36; F05D 2240/12; F05D 2240/127; F05D 2240/306

USPC ................................... 415/144, 171.1, 173.7

See application file for complete search history.

(56) References Cited

U.S. PATENT DOCUMENTS

| | | | |
|---|---|---|---|
| 3,262,635 A * | 7/1966 | Smuland | ................. F01D 11/02 277/414 |
| 3,442,493 A | 5/1969 | Smith, Jr. | |
| 3,549,272 A * | 12/1970 | Bouiller | ................. F01D 5/022 415/130 |
| 3,739,580 A | 6/1973 | Bland et al. | |
| 3,861,822 A | 1/1975 | Wanger | |
| 3,946,554 A | 3/1976 | Neumann | |
| 4,000,868 A | 1/1977 | Gregor | |
| 4,089,493 A | 5/1978 | Paulson | |
| 4,235,397 A | 11/1980 | Compton | |
| 4,254,619 A | 3/1981 | Giffin, III et al. | |
| 4,705,452 A | 11/1987 | Karadimas | |
| 4,791,783 A | 12/1988 | Neitzel | |

(Continued)

*Primary Examiner* — Ehud Gartenberg
*Assistant Examiner* — James McGlynn
(74) *Attorney, Agent, or Firm* — Duane Morris LLP

(57) ABSTRACT

A turbofan engine has a fan portion in fluid communication with a core stream and a bypass stream of air separated by splitters disposed both upstream and downstream of the fan portion. A fluid passage is defined between the splitters. The turbofan engine has a plurality of high pressure fluid jets originating from the low pressure side of the fan blades, the jets restricting the migration of the core stream into the bypass stream through the fluid passage.

19 Claims, 15 Drawing Sheets

(56) References Cited

U.S. PATENT DOCUMENTS

| | | |
|---|---|---|
| 5,180,119 A | 1/1993 | Picard |
| 5,314,301 A | 5/1994 | Knight |
| 5,464,175 A | 11/1995 | Short |
| 5,472,314 A | 12/1995 | Delonge et al. |
| 5,518,363 A | 5/1996 | Theis |
| 5,520,511 A | 5/1996 | Loudet et al. |
| 5,855,340 A | 1/1999 | Bacon |
| 5,911,679 A | 6/1999 | Farrell et al. |
| 5,947,412 A | 9/1999 | Berman |
| 6,379,110 B1 | 4/2002 | McCormick et al. |
| 6,845,606 B2 | 1/2005 | Franchet et al. |
| 7,033,132 B2 | 4/2006 | Gharib |
| 7,059,129 B2 | 6/2006 | Zollinger et al. |
| 7,114,911 B2 | 10/2006 | Martin et al. |
| 7,134,631 B2 | 11/2006 | Loth |
| 7,140,188 B2 | 11/2006 | Hosokawa et al. |
| 7,444,802 B2 | 11/2008 | Parry |
| 7,464,533 B2 | 12/2008 | Wollenweber |
| 7,491,030 B1 | 2/2009 | Pinera et al. |
| 7,549,839 B2 | 6/2009 | Carroll et al. |
| 7,631,483 B2 | 12/2009 | Mani et al. |
| 7,665,689 B2 | 2/2010 | McComb |
| 7,669,404 B2 | 3/2010 | Samimy et al. |
| 7,828,516 B2 | 11/2010 | Hartmann et al. |
| 7,837,436 B2 | 11/2010 | Corsmeier et al. |
| 7,877,980 B2 | 2/2011 | Johnson |
| 7,887,287 B2 | 2/2011 | Yanagi et al. |
| 8,011,882 B2 | 9/2011 | McMillan |
| 8,152,095 B2 | 4/2012 | Cazals et al. |
| 8,161,728 B2 | 4/2012 | Kupratis |
| 8,336,289 B2 | 12/2012 | Roberge |
| 8,393,857 B2 | 3/2013 | Copeland et al. |
| 8,468,795 B2 | 6/2013 | Suciu et al. |
| 8,529,188 B2 | 9/2013 | Winter |
| 8,578,700 B2 | 11/2013 | Khakhar |
| 8,657,561 B2 | 2/2014 | Buffone et al. |
| 8,770,921 B2 | 7/2014 | Huber et al. |
| 8,813,907 B2 | 8/2014 | Tanaka et al. |
| 8,862,362 B2 | 10/2014 | Teicholz et al. |
| 8,915,703 B2 | 12/2014 | Mohammed |
| 9,003,768 B2 | 4/2015 | Suciu et al. |
| 9,016,041 B2 | 4/2015 | Baughman et al. |
| 9,017,038 B2 | 4/2015 | Pelley et al. |
| 2008/0131268 A1 | 6/2008 | Guemmer |
| 2010/0166543 A1 | 7/2010 | Carroll |
| 2011/0146289 A1 | 6/2011 | Baughman |
| 2011/0167791 A1 | 7/2011 | Johnson et al. |
| 2011/0167792 A1 | 7/2011 | Johnson et al. |
| 2011/0167831 A1 | 7/2011 | Johnson |
| 2011/0176913 A1 | 7/2011 | Wassynger et al. |
| 2011/0252808 A1 | 10/2011 | McKenney et al. |
| 2013/0323013 A1 | 12/2013 | Mercier et al. |
| 2014/0090388 A1 | 4/2014 | Hasel |
| 2014/0260180 A1 | 9/2014 | Kupratis et al. |
| 2014/0345253 A1 | 11/2014 | Dawson et al. |
| 2015/0102156 A1 | 4/2015 | Devenyi |
| 2015/0121838 A1 | 5/2015 | Suciu et al. |

* cited by examiner

SYSTEM AND METHOD FOR A FLUIDIC BARRIER ON THE LOW PRESSURE SIDE OF A FAN BLADE

RELATED APPLICATIONS

This application is related to concurrently filed and co-pending applications U.S. patent application Ser. No. 14/837,190, filed 27 Aug. 2015, entitled "Splayed Inlet Guide Vanes"; U.S. patent application Ser. No. 14/837,302, filed 27 Aug. 2015 entitled "Morphing Vane"; U.S. patent application Ser. No. 14/837,557, filed 27 Aug. 2015, entitled "Propulsive Force Vectoring"; U.S. patent application Ser. No. 14/837,942, filed on 27 Aug. 2015, entitled "System and Method for a Fluidic Barrier on the Low Pressure Side of a Fan Blade"; U.S. patent application Ser. No. 14/837,987, filed 27 Aug. 2015, entitled "System and Method for a Fluidic Barrier from the Upstream Splitter"; U.S. patent application Ser. No. 14/837,031, filed 27 Aug. 2015, entitled "Gas Turbine Engine Having Radially-Split Inlet Guide Vanes"; U.S. patent application Ser. No. 14/838,027, filed 27 Aug. 2015, entitled "System and Method for Creating a Fluidic Barrier with Vortices from the Upstream Splitter"; U.S. patent application Ser. No. 14/838,067, filed 27 Aug. 2015, entitled "A System and Method for a Fluidic Barrier from the Leading Edge of a Fan Blade." The entirety of these applications are incorporated herein by reference.

BACKGROUND

Fluid propulsion devices achieve thrust by imparting momentum to a fluid called the propellant. An air-breathing engine, as the name implies, uses the atmosphere for most of its propellant. The gas turbine produces high-temperature gas which may be used either to generate power for a propeller, fan, generator or other mechanical apparatus or to develop thrust directly by expansion and acceleration of the hot gas in a nozzle. In any case, an air breathing engine continuously draws air from the atmosphere, compresses it, adds energy in the form of heat, and then expands it in order to convert the added energy to shaft work or jet kinetic energy. Thus, in addition to acting as propellant, the air acts as the working fluid in a thermodynamic process in which a fraction of the energy is made available for propulsive purposes or work.

Typically turbofan engines include at least two air streams. All air utilized by the engine initially passes through a fan, and then it is split into the two air streams. The inner air stream is referred to as core air and passes into the compressor portion of the engine, where it is compressed. This air then is fed to the combustor portion of the engine where it is mixed with fuel and the fuel is combusted. The combustion gases are then expanded through the turbine portion of the engine, which extracts energy from the hot combustion gases, the extracted energy being used to run the compressor, the fan and other accessory systems. The remaining hot gases then flow into the exhaust portion of the engine, which may be used to produce thrust for forward motion to the aircraft.

The outer air flow stream bypasses the engine core and is pressurized by the fan. Typically, no other work is done on the outer air flow stream which continues axially down the engine but outside the core. The bypass air flow stream also can be used to accomplish aircraft cooling by the introduction of heat exchangers in the fan stream. Downstream of the turbine, the outer air flow stream is used to cool engine hardware in the exhaust system. When additional thrust is required (demanded), some of the fans bypass air flow stream may be redirected to the augmenter (afterburner) where it is mixed with core flow and fuel to provide the additional thrust to move the aircraft.

Many current and most future aircrafts need efficient installed propulsion system performance capabilities at diverse flight conditions and over widely varying power settings for a variety of missions. Current turbofan engines are limited in their capabilities to supply this type of mission adaptive performance, in great part due to the fundamental operating characteristics of their core systems which have limited flexibility in load shifting between shaft and fan loading.

When defining a conventional engine cycle and configuration for a mixed mission application, compromises have to be made in the selection of fan pressure ratio, bypass ratio, and overall pressure ratio to allow a reasonably sized engine to operate effectively. In particular, the fan pressure ratio and related bypass ratio selection needed to obtain a reasonably sized engine capable of developing the thrusts needed for combat maneuvers are non-optimum for efficient low power flight where a significant portion of the engine output is transmitted to the shaft. Engine performance may suffer due to the bypass/core pressure leakage that may occur at reduced fan power/load settings.

Referring to the drawings wherein identical reference numerals denote the same elements throughout the various views, FIG. 1a shows a general orientation of a turbofan engine in a cut away view. In the turbofan engine shown, the flow of the air is generally axial. The engine direction along the axis is generally defined using the terms "upstream" and "downstream" generally which refer to a position in a jet engine in relation to the ambient air inlet and the engine exhaust at the back of the engine. For example, the inlet fan is upstream of the combustion chamber. Likewise, the terms "fore" and "aft" generally refer to a position in relation to the ambient air inlet and the engine exhaust nozzle. Additionally, outward/outboard and inward/inboard refer to the radial direction. For example the bypass duct is outboard the core duct. The ducts are generally circular and co-axial with each other.

As ambient inlet airflow 12 enters inlet fan duct 14 of turbofan engine 10, through the guide vanes 15, passes by fan spinner 16 and through fan rotor (fan blade) 42. The airflow 12 is split into primary (core) flow stream 28 and bypass flow stream 30 by upstream splitter 24 and downstream splitter 25. In FIG. 2, the bypass flow stream 30 along with the core/primary flow stream 28 is shown, the bypass stream 30 being outboard of the core stream 28. The inward portion of the bypass steam 30 and the outward portion of the core streams are partially defined by the splitters upstream of the compressor 26. The fan 42 has a plurality of fan blades.

As shown in FIGS. 1a and 1b the fan blade 42 shown is rotating about the engine axis into the page, therefor the low pressure side of the blade 42 is shown, the high pressure side being on the opposite side. The Primary flow stream 28 flows through compressor 26 that compresses the air to a higher pressure. The compressed air typically passes through an outlet guide vane to straighten the airflow and eliminate swirling motion or turbulence, a diffuser where air spreads out, and a compressor manifold to distribute the air in a smooth flow. The core flow stream 28 is then mixed with fuel in combustion chamber 35 and the mixture is ignited and burned. The resultant combustion products flow through turbines 38 that extract energy from the combustion gases to turn fan rotor 42, compressor 26 and any shaft work by way of turbine shaft 40. The gases, passing exhaust cone, expand through an exhaust nozzle 43 to produce thrust. Primary flow stream 28 leaves the engine at a higher velocity than when it entered. Bypass flow stream 30 flows through fan rotor 42, flows by bypass duct outer wall 27, an annular duct concentric with the core engine flows through fan discharge outlet and is expanded through an exhaust nozzle to produce additional thrust. Turbofan engine 10 has a generally longitudinally extending centerline represented by engine axis 46.

Current conventionally bladed core engines cannot maintain constant or near constant operating pressure ratios as bypass flow is reduced. Current conventionally bladed fan rotors do not have the flexibility in efficiently reducing fan pressure ratio while maintaining core pressure.

With reduced or no flow in the Bypass stream 30, the core stream 28 relative pressure is greater than that in the Bypass stream 30. In the area of the fan shown as 50 in FIG. 1b, higher pressure air may leak across the region 50 from the core stream 28 into the bypass stream 30 thus reducing the core pressure which has a deleterious effect on the operation of the core and un-necessarily loading the turbine to recover the lost pressure.

A fluid barrier separating the core and bypass streams as described herein, can limit the pressure loss in the core and the subsequent degradation in output of the core engine. High pressure jets along with vortices may be arranged proximate to the fan at the interface between the bypass and core streams. The jets and vortices are imparted with significant momentum to resist passage of the higher pressure core stream into the bypass stream, where the use of splitters are not practical due to the positioning and location of the fan.

These and many other advantages of the present subject matter will be readily apparent to one skilled in the art to which the invention pertains from a perusal of the claims, the appended drawings, and the following detailed description of preferred embodiments.

DETAILED DESCRIPTION

Figure 1A:
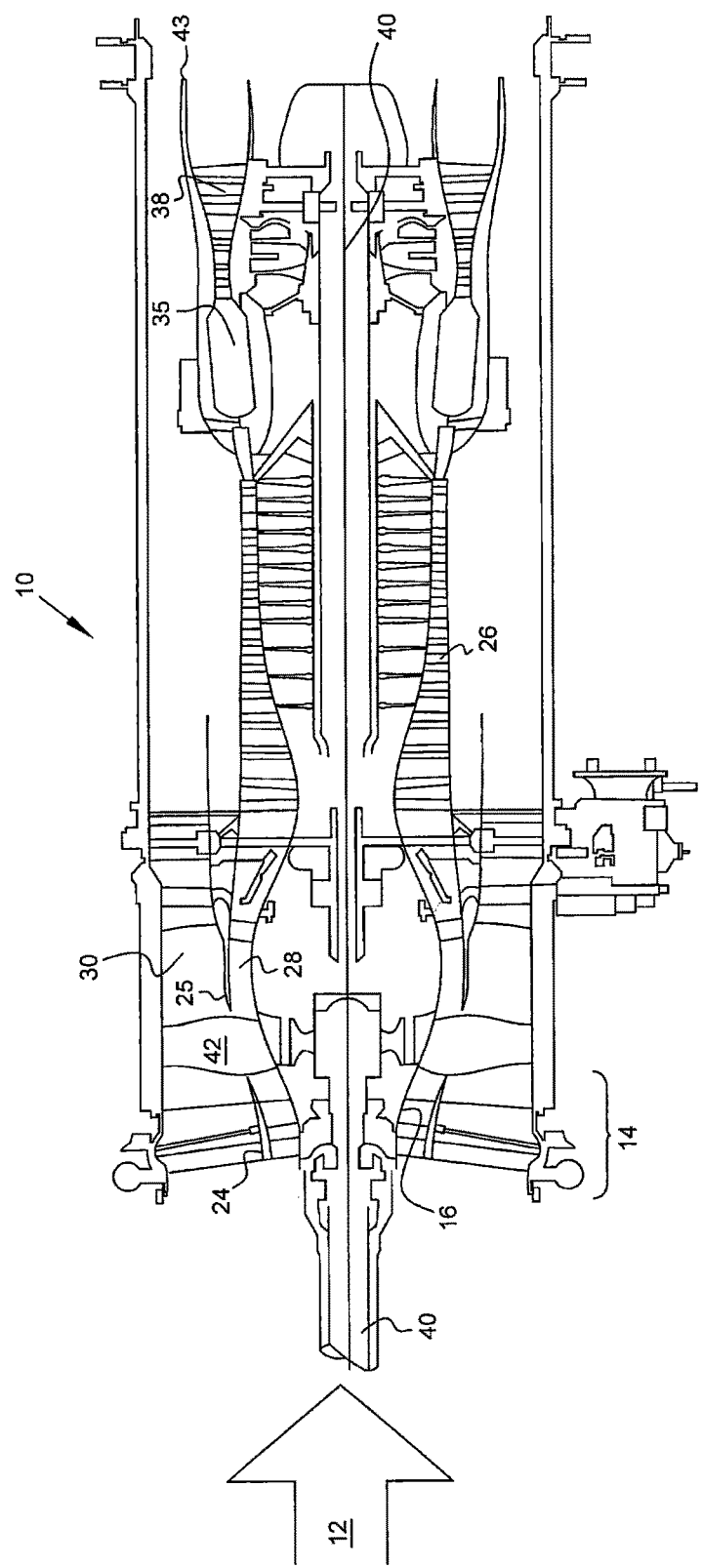
FIGS. 1a and 1b are illustrations representing conventional turbofan engines.
Figure 1B:
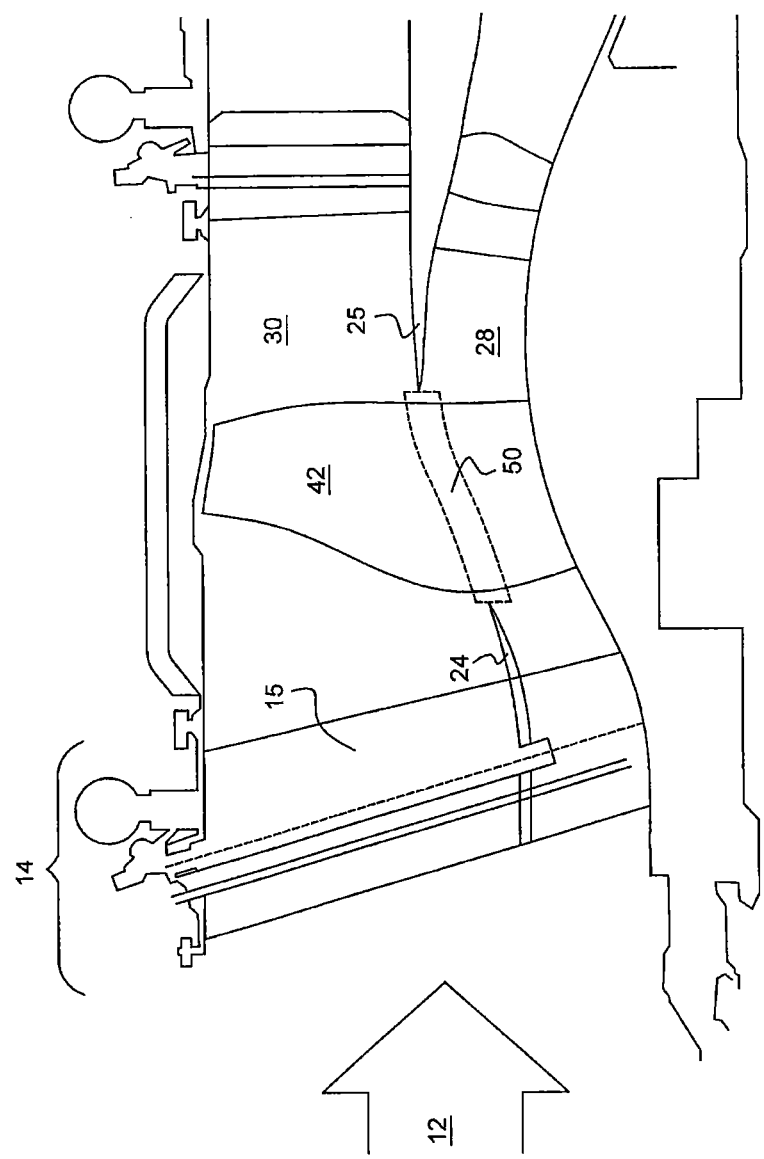
Figure 2:
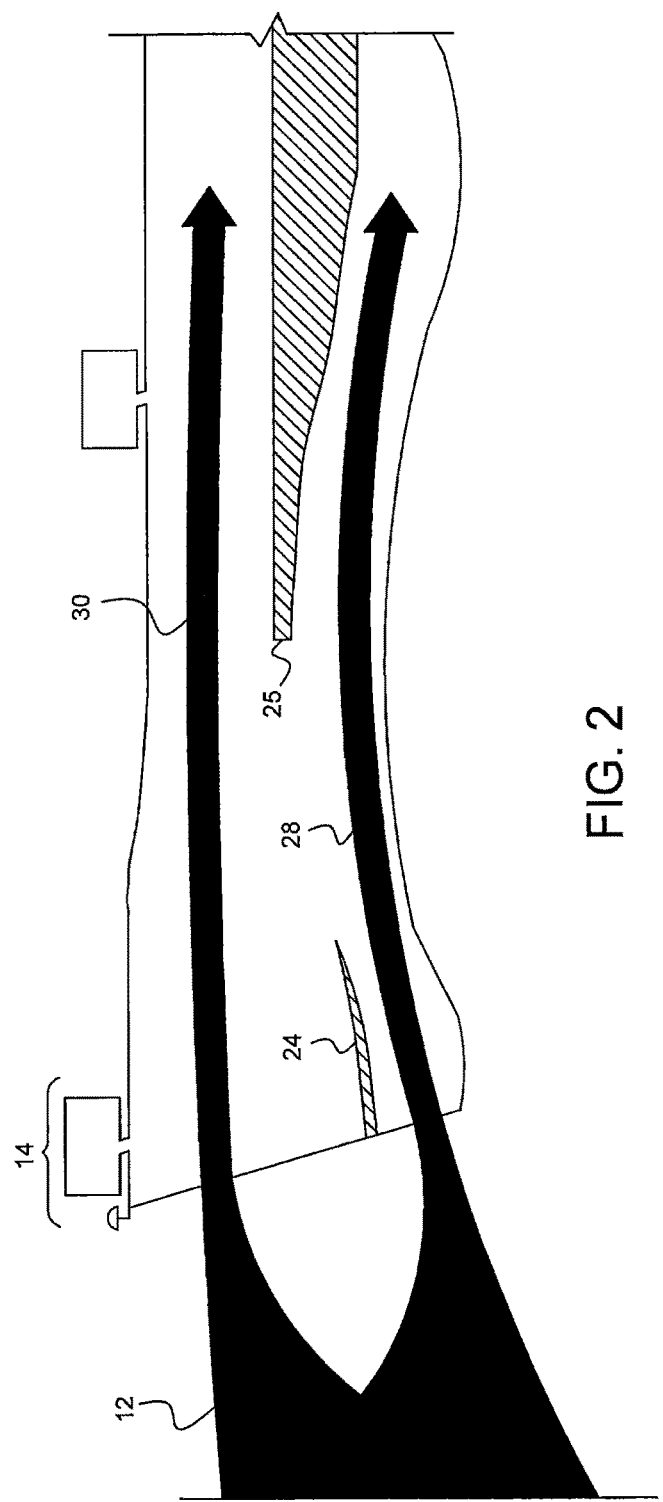
FIG. 2 is an illustration of the Bypass and primary stream flow paths.
Figure 3:
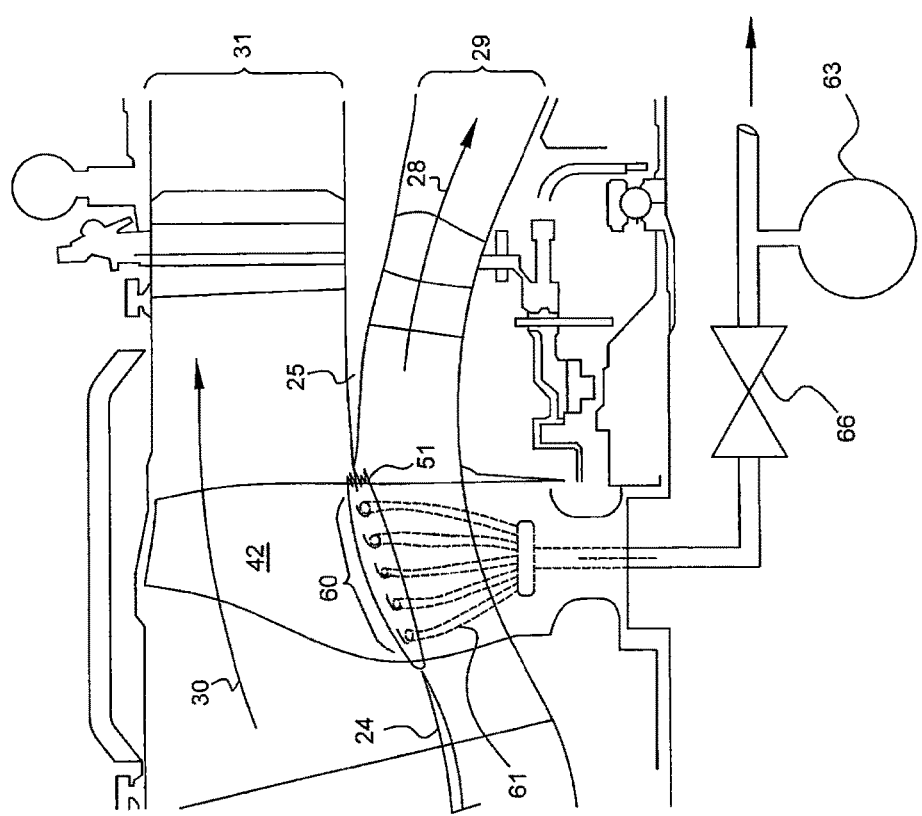
FIG. 3 is an illustration of a turbofan engine with high pressure jets projecting from the low pressure side of Fan blades according to an embodiment of the disclosed subject matter.

FIG. 3 illustrates a Bypass flow duct 31 lying radially outward from the core flow duct 29. The fan blade 42 is positioned upstream from the splitter 25 that separates air flow between the ducts. The upstream splitter 24 is positioned upstream from the fan blade 42 at the bottom of the Inlet guide vane 15. As the inlet guide vane angle is changed, the bypass flow can be inhibited and pressure within the bypass flow duct 31 can differ from the pressure present in the core flow duct 29. Air can cross between the two ducts in the vicinity of the fan blade in region 50 as shown in FIG. 1b thus causing detrimental engine performance in the core as described previously.

A plurality of fluidic jets 60 that inject high pressure compressor air form the fan blade 42 into the region 50 between the upstream 24 and downstream splitter 25 form a fluid barrier 51. The high velocity jets 60 of compressed air contain enough momentum to inhibit flow leakage between the core 28 and the bypass streams 30. The jets 60 have inertia that the low pressure air flowing in the ducts cannot overcome, thereby acting as a fluid barrier 51 to limit cross flow and pressure leakage in the region 50 between the ducts.

The fluid jets 60 may advantageously have a directional component in a substantial opposite direction of the local velocity or rotation of the fan proximate to the splitters and may also have a radial component towards the axis to prevent pressure leakage across the fluid jets into the bypass stream.

A valve 66 in the system modulates the high pressure air such that flow can be turned on and off depending on the predicted or actual cross flow between ducts and the detrimental effects upon the engine.

As noted previously, the control of air flow through the duct may be throttled to a point where it can be minimized to the point where it is almost non-existent through the use of a small and inexpensive actuator.

The high pressure gas for the jets may be provided by the compressor 26 though passages 61 to the jets. An accumulator 63 may also be provided prior to the actuator/valve in order to provide an immediate source of pressure unstrained by downstream frictional losses in the passages 61. Alternatively, another source may be used to provide the high pressure air to the jets 60.

The high pressure fluid jets 60 originate from orifices on the low pressure side of the blades 42 wherein the plurality of orifices are radially proximate the upstream and downstream splitters in the region 50. The plurality of orifices extend between the trailing edge of the upstream splitter 24 and the leading edge of the downstream splitter 25. The fluid jets may advantageously having radial component directed into the core flow 28 as well as an axial component pointing downstream in the core flow 28. It is envisioned that the compressed air drawn from the compressor 26 would represent 2-3% of the total compressor output and thus would not be a significant source of loss.

Figure 4:
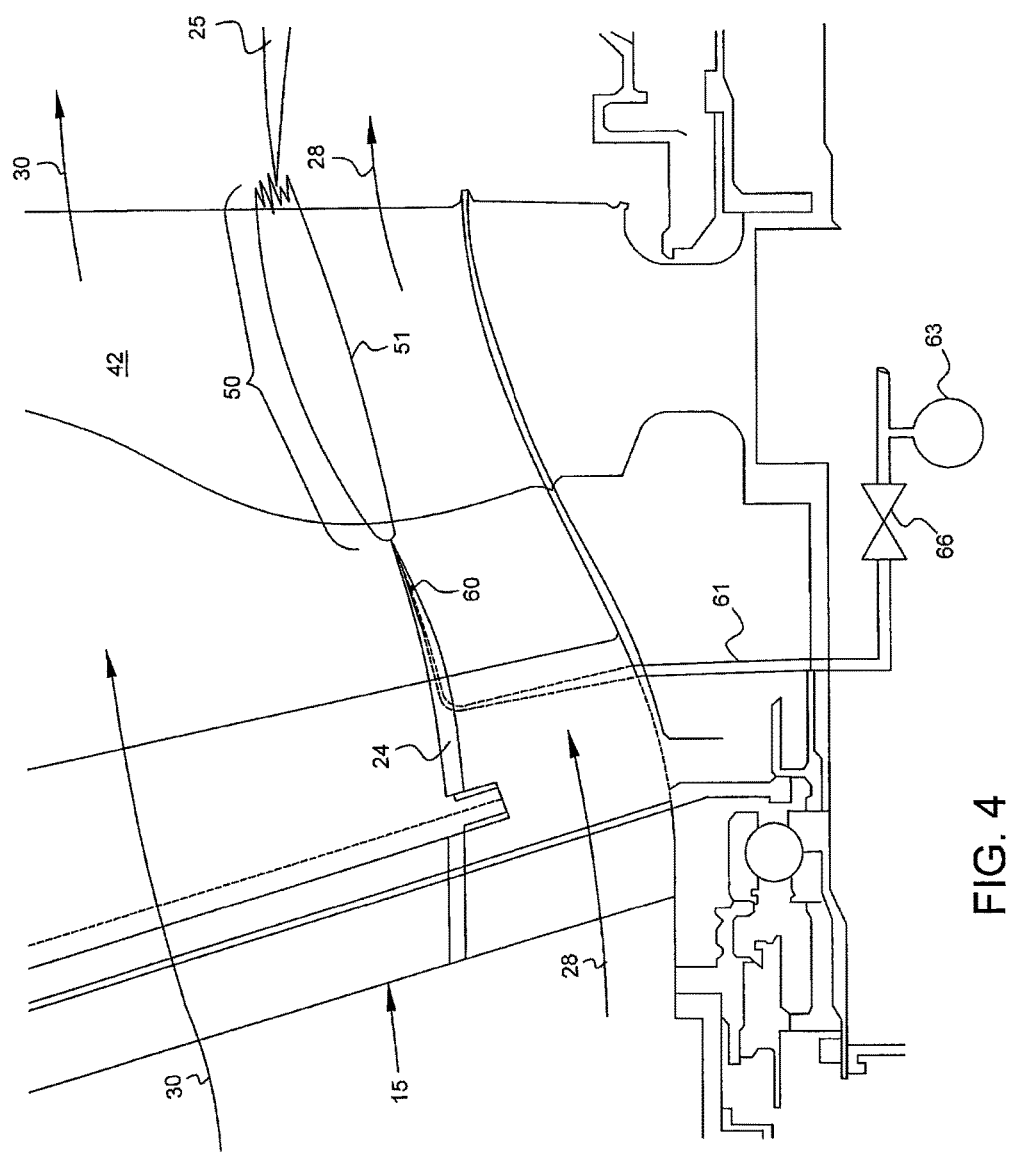
FIG. 4 is an illustration of a turbofan engine with high pressure jets projection from the trailing edge of an upstream splitter according to an embodiment of the disclosed subject matter.

FIG. 4 illustrates another embodiment of a turbofan engine 10. As shown the fan blade 42 is positioned upstream from a splitter 24 that separates air flow between the ducts. An upstream splitter 24 is positioned upstream from the fan blade 42 at the bottom of the inlet guide vane 15. As the inlet guide vane angle is changed, pressure within the bypass flow duct 31 can differ from the pressure present in the core flow duct 29. Air can cross between the two ducts in the vicinity of the fan blade 42 in region 50 thus causing detrimental engine performance.

As shown in FIG. 4, fluid jets 60 that inject high pressure compressor air from the trailing edge of the upstream splitter 24 into the region 50 between the upstream 24 and downstream splitters 25. As described previously these jets 50 have enough momentum or inertia such that the low pressure air flowing in the ducts cannot overcome it and thus the jets 50 acts as a fluid barrier 51 to limit cross flow between the ducts. As also discussed previously, a valve/actuator 66 in the system may regulate the high pressure air such that flow can be turned on and off depending on the predicted or actual cross flow between ducts, and the corresponding detrimental effects on engine performance, an accumulator 63 may also be added. The high pressure jets 60 are preferably distributed proximate to the trailing edge of the upstream splitter 24. The high pressure jets may be also be position on either the core 28 or bypass side 30 of the upstream splitter 24 since the jets 60 have an energy independent of the flow within the ducts. The reliance on free stream flow is discussed below with respect to creation of vortices. The high pressure gas for the jets 60 is supplied by the compressor 26 via passages 61. The jets 60 and passages 61 are distributed circumferentially along the trailing edge.

Figure 6:
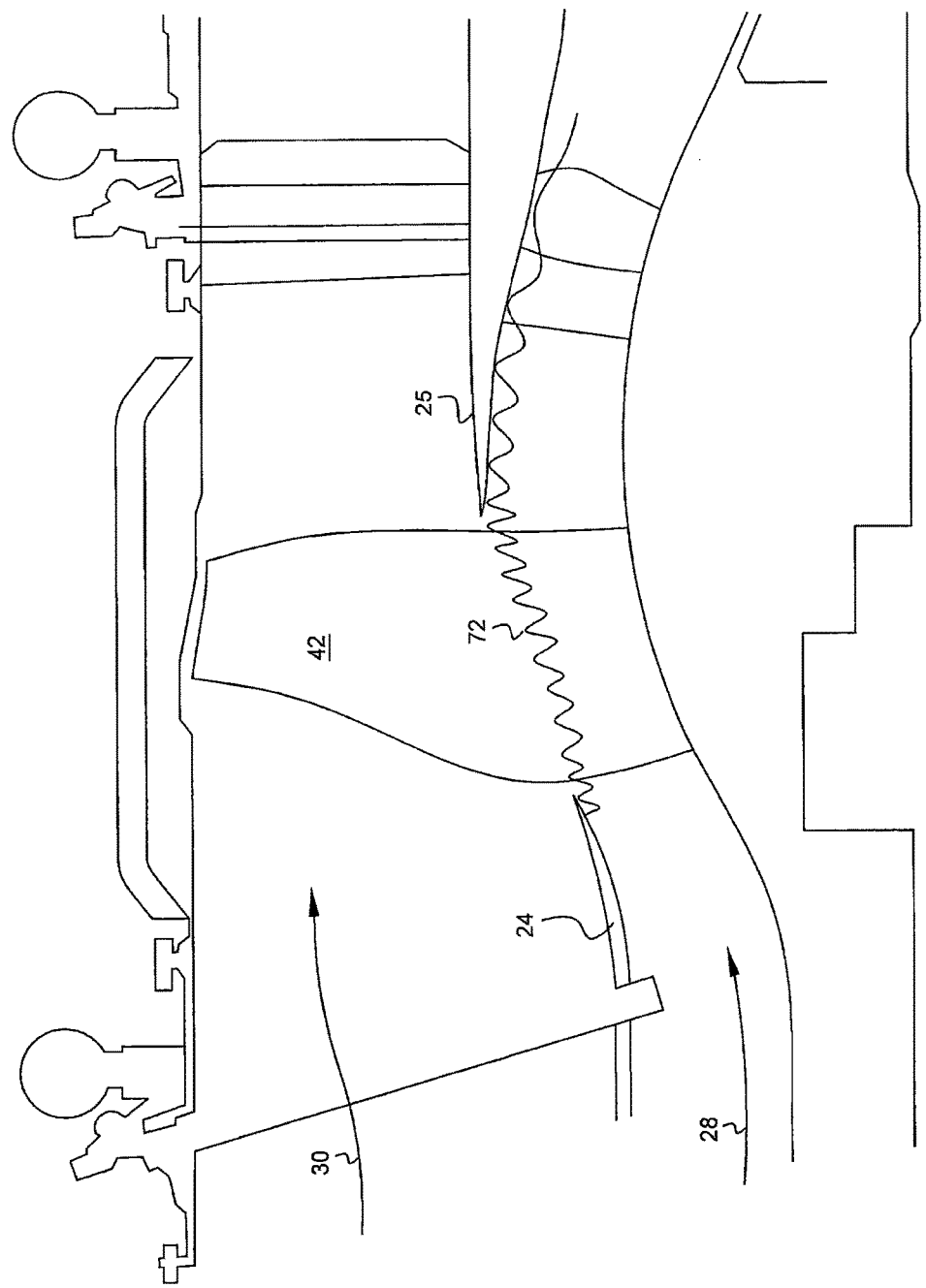
FIG. 6 illustrates a turbofan with vortices origination from the splitter through the fan region according to an embodiment of the disclosed subject matter.

FIG. 6 illustrates a turbofan engine with concentric core and bypass flow paths and variable inlet guide vanes in the bypass duct. As shown, pressure differences between the core duct and the bypass duct can cause cross flow between the ducts in the area of the fan blade. In FIG. 6, the Bypass flow duct lies radially outward from the Core flow duct. A fan blade is positioned upstream from a downstream splitter that separates air flow between the ducts. An upstream splitter is positioned upstream from the fan blade at the bottom of the inlet guide vane.

As the inlet guide vane angle is changed, pressure within the bypass flow duct can differ from the pressure present in the core flow duct. The working fluid in this example air can cross between the two ducts in the vicinity of the fan blade and cause detrimental engine performance as explained previously.

Figure 7A:
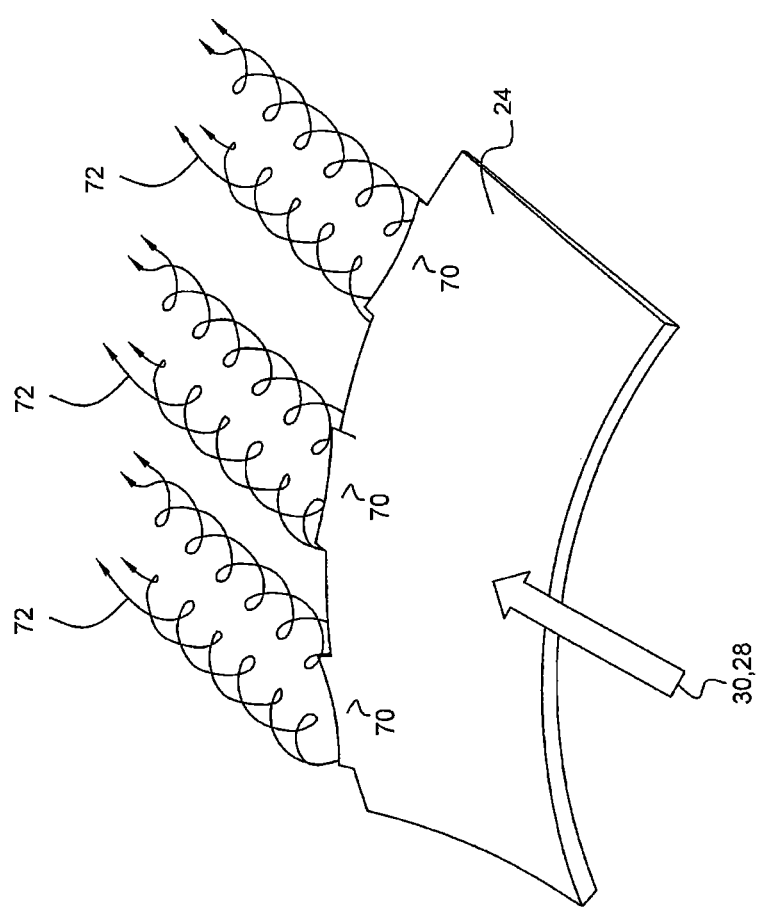
FIGS. 7a-7b shows the generation of vortices from ramps according to an embodiment of the disclosed subject matter
Figure 7B:
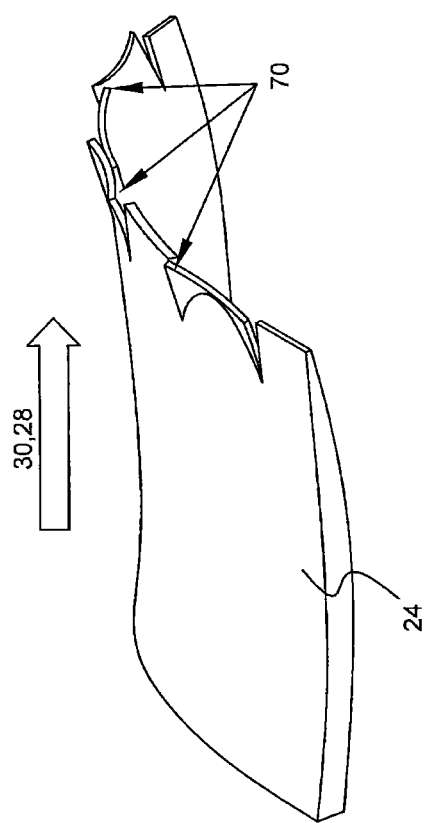

FIGS. 7a-7b illustrate the upstream splitter 24 with a plurality of vortex generators 70. The vortex generator 70 results in counter rotating vortices 72 that are paired and circumferentially positioned around the exit plane (trailing edge) of the upstream splitter 24. The vortices 72 are generated or tripped by several mechanisms as described further below, these mechanisms involve interruptions in the surface which disrupt and trip the bypass flow 30 or core flow 28. In FIGS. 7a-7b, the vortex pairs are tripped using intermittent subtle ramps or wedges that initiate a vortex 72. It is a localized pressure differential in the flow which initiates the vortices 72. The vortices 72 have momentum that tends to maintain its flow position in the region 50 between the ducts that inhibits flow and pressure loss between the ducts. The vortex 72 has momentum that the relative low pressure air from flowing in the ducts cannot overcome thereby causing the series of adjacent vortices to act as a fluidic barrier 51 to limit cross flow between the ducts.

While for ease of illustration, the surface interruptions are shown on the top side or outside surface of the upstream splitter 24. In FIGS. 7a-7b, the surface interruptions are preferably on the inner surface of the upstream splitter interrupting the core flow. This arrangement becomes more advantageous as the bypass flow/pressure is substantially decreased by the by the closing inlet vane guides 15 in the bypass flow path 30.

Figure 8D:
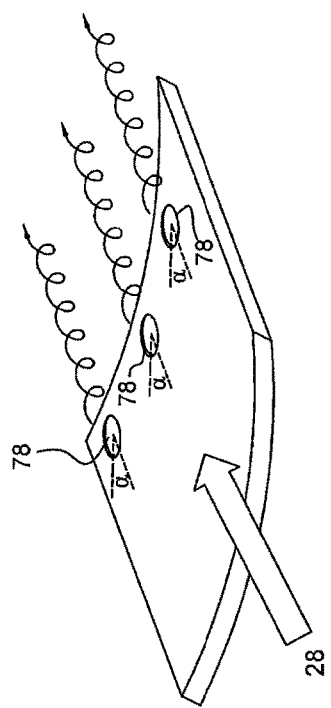
FIGS. 8a-8d are different surface interruptions for the generation of vortices as described for embodiments of the disclosed subject matter.
Figure 8A:
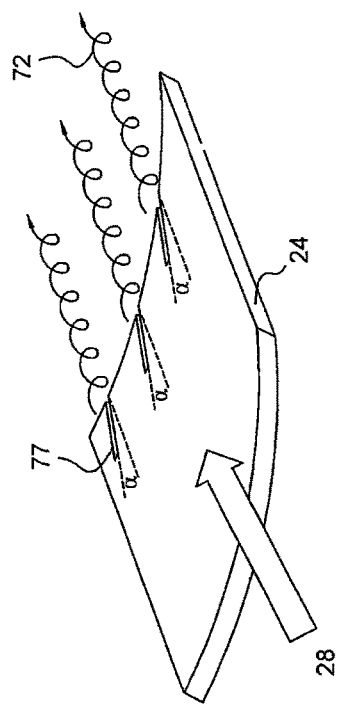
Figure 8B:
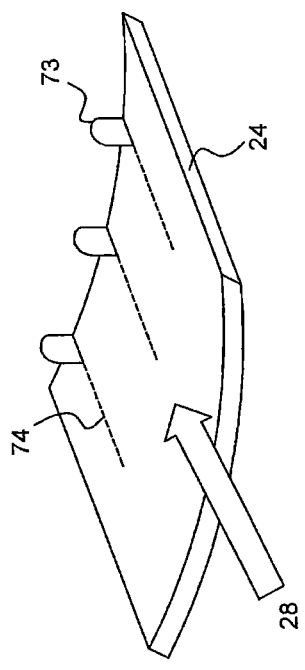
Figure 8B:
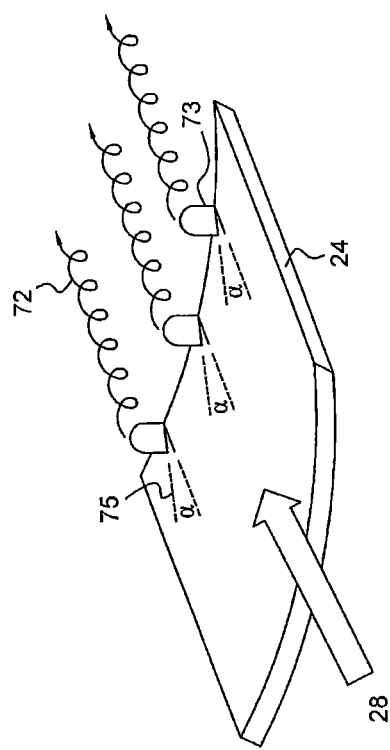
Figure 8C:
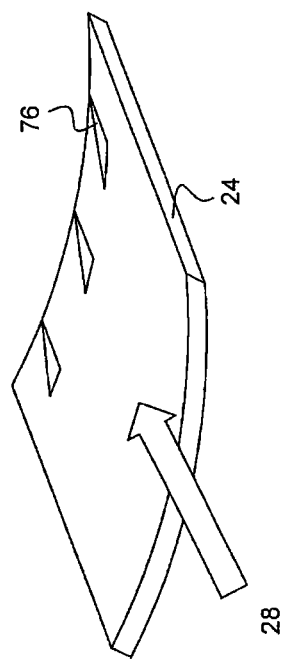
Figure 8C:
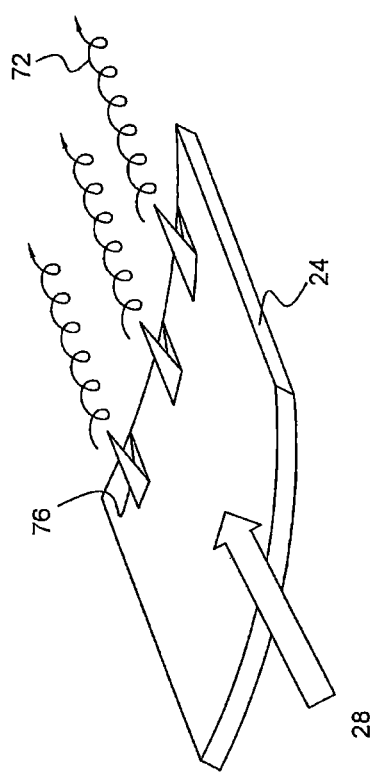

FIGS. 8a-8d illustrate several examples of surface interruptions envisioned for creating the vortices. FIG. 8a shows a plurality of ridges 77 extending into the core stream 28. The ridges 77 are oblique to the flow in order to initiate the vortices 72. FIG. 8b shows a plurality of blades 73 also oriented oblique to the air flow. The blades 73 may also be rotated as to change their orientation. For example, where the pressure differential between the bypass 30 and core paths 28 proximate the fan in region 50 is small, the need for a fluid barrier 51 is diminished and thus the blades 73 may be oriented with the flow in a first position 74 and only orient oblique to the flow when the pressure differential becomes significant in a second position 75. FIG. 8c shows the plurality of flaps 76 extending into the core stream 28. Similarly as described with respect to the blades, the flaps 76 may be in a flush first position 74 when a fluid barrier 51 is not required and may be extended to a second position 75 to initiate the vortices 72 when desired. FIG. 8d shows a plurality of grooves 78 recessed into the upstream splitter 24 in order to trip the flow and generate the vortices 72 as the fluid barrier 51. The grooves 78 may extend to the end of the upstream splitter 24 or terminate proximate but before the trailing edge.

As noted previously, the interruptions may be arranged to create complimentary pairs of vortices as shown in FIGS. 7a-7b, one rotating clockwise and the other rotating counter clockwise. Alternatively, the interruption may be arranged to create vortices that each rotate the same direction, or alternating between different directions as shown in FIGS. 7a-7b and FIG. 8a.

Figure 9A:
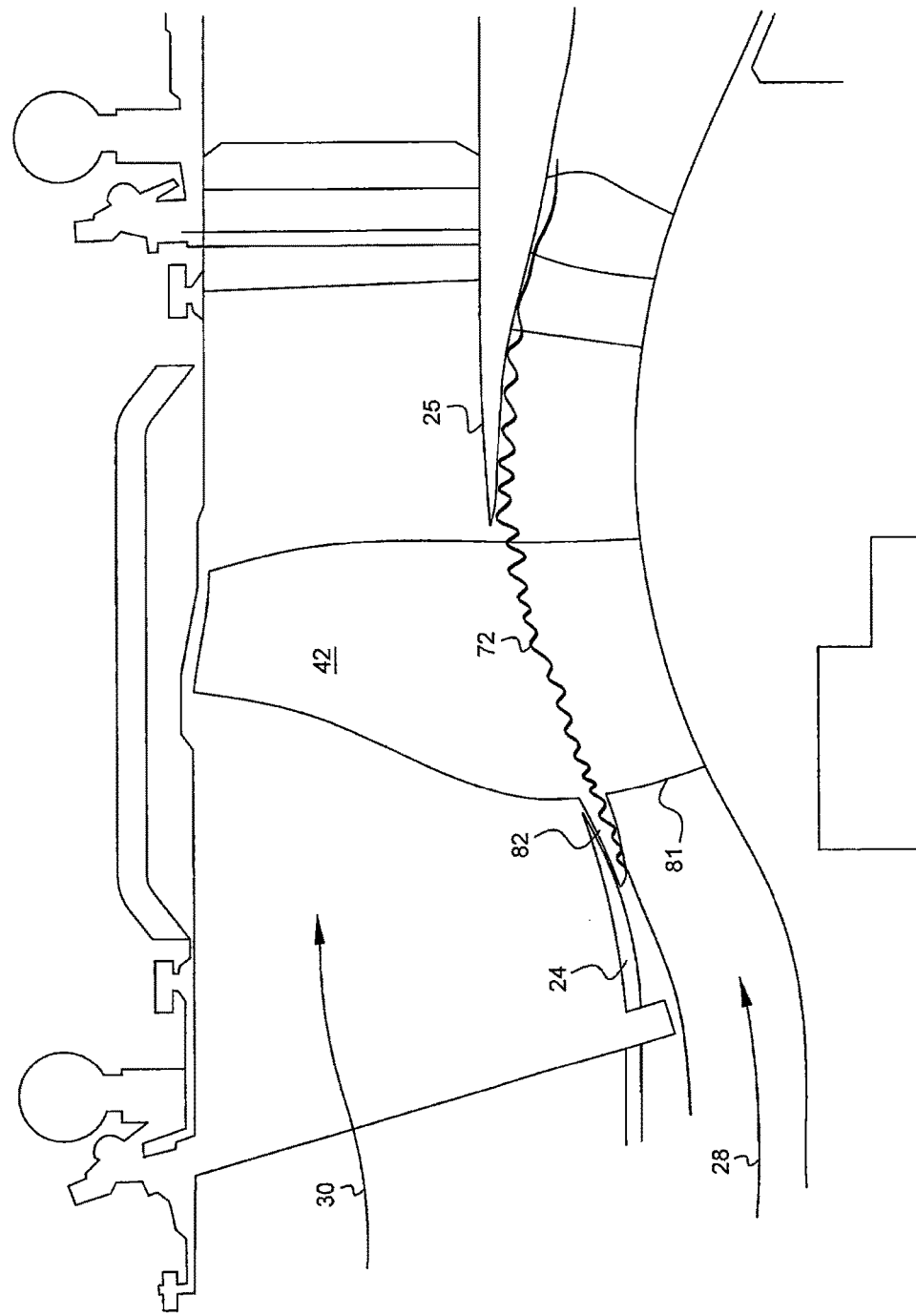
FIGS. 9a and 9b are illustrations of vortex generators on the leading edge of the fan according to embodiments of the present subject matter.
Figure 9B:
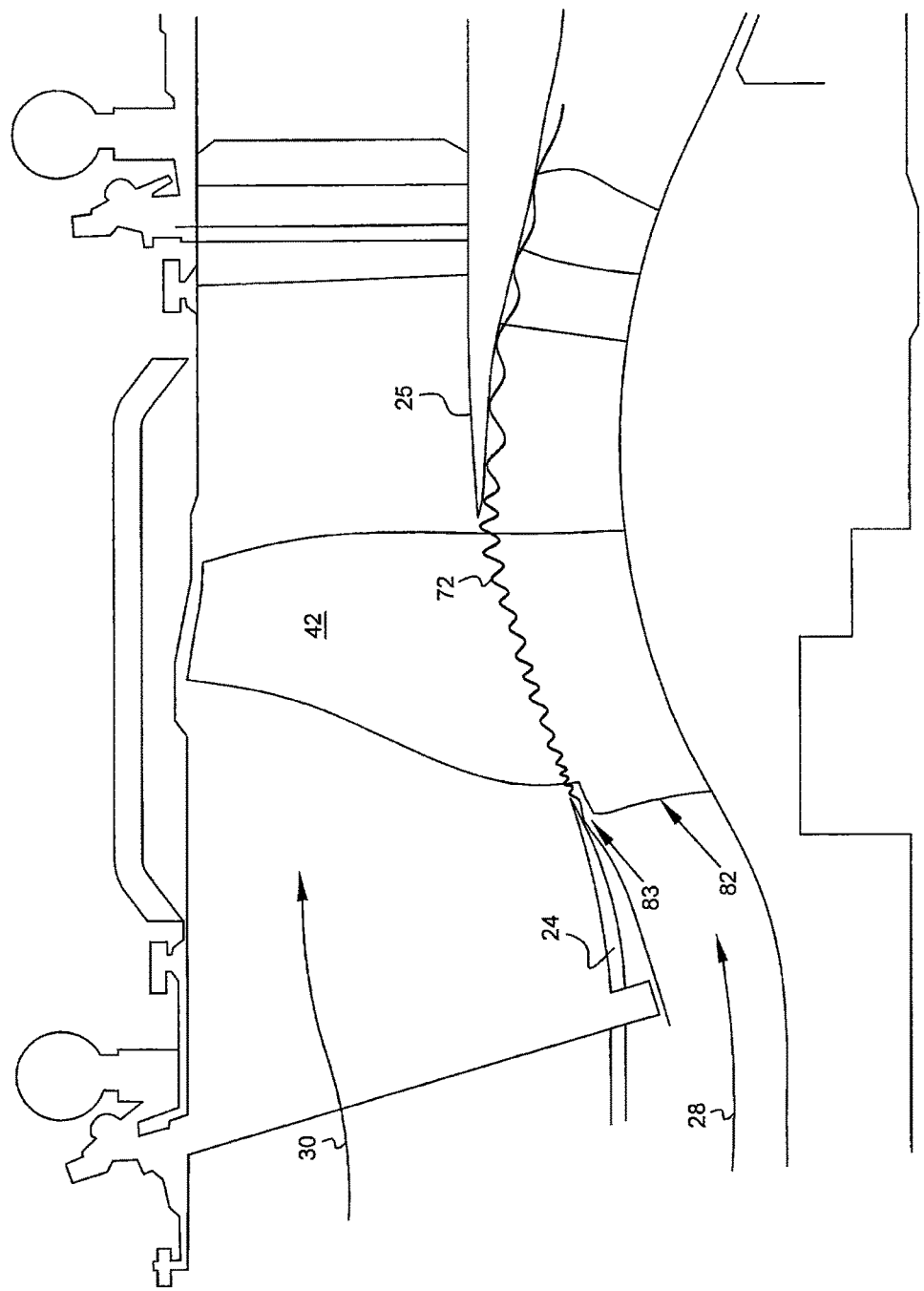

FIG. 9a illustrates the generation of vortices 72 from the leading edge of the fan. As shown, a vane 82 extends from the leading edge 81 of the fan proximate the upstream splitter 24. In FIG. 9a or 9b, the vane 82 is shown in the core stream 28, however while less preferable, the vane 82 may be in the bypass flow 30 as well. The vane 82, in FIG. 9a acts as a low aspect ratio wing, and thus spills air from the high pressure side of the blade 42 to the low pressure side, thus generating vortices 72 that extend along the border region 50 between the bypass 30 and core stream 28. As shown in FIG. 9b, the vane 82 may be an extension of the fan blade 42 upstream, in which a significant gap 83 between the vane 82 and the upstream splitter 24 allows high pressure air to escape to the low pressure side which also results in the creation of vortices 72 as a fluid barrier 51. In addition the vane 82 may be stepped in order to produce a series of vortices on each blade and creating a radial gradient of vortices.

An embodiment of the vane may be triangular with a root and vane leading edge. The root extending upstream of a trailing edge of the upstream splitter and the vane leading edge extending from an upstream portion of the root into the core stream and terminating on the leading edge of one of the plurality of fan blades. The vane 82 may also be of many other known wing shapes that facilitate spillage to create vortices.

Alternatively other surface disruptions may be utilized on the leading edge 81 of the fan 42 to create the vortices which act as fluid barriers between the core and bypass streams. For example, groves or protrusions similar to those described in FIGS. 8a-8d can be added to the fan blades to generate the vortices.

Figure 5:
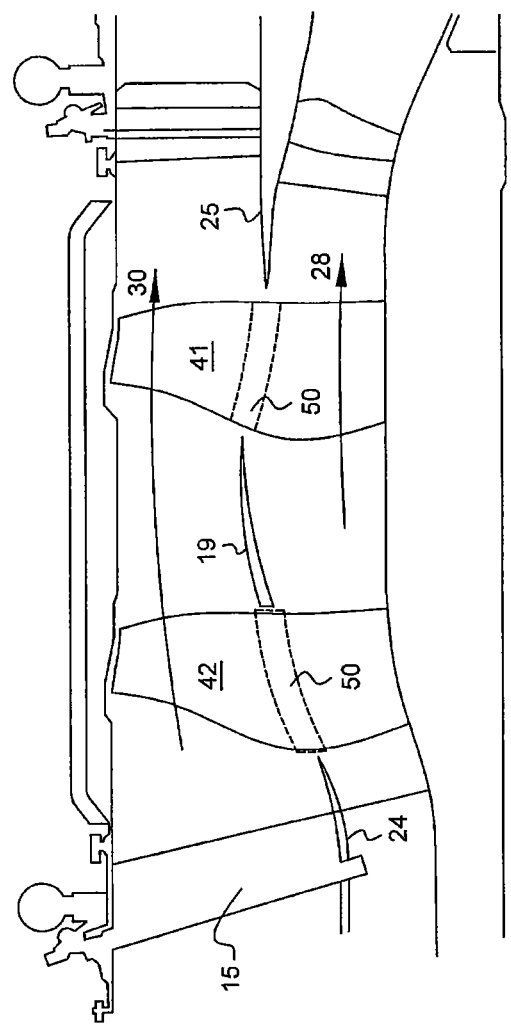
FIG. 5 is an illustration of a third splitter with multiple fan stages according to embodiments of the disclosed subject matter.

FIG. 5 is an illustration of a third splitter with multiple fan stages according to embodiments of the disclosed subject matter. The fans 42 may be nested with a midstream or third splitter 19 between them. In such case, the third splitter 19 would advantageously also be provided with similar surface interruptions or jets to provide a fluid barrier 51 between the third splitter 19 and downstream splitter 25.

Figure 10:
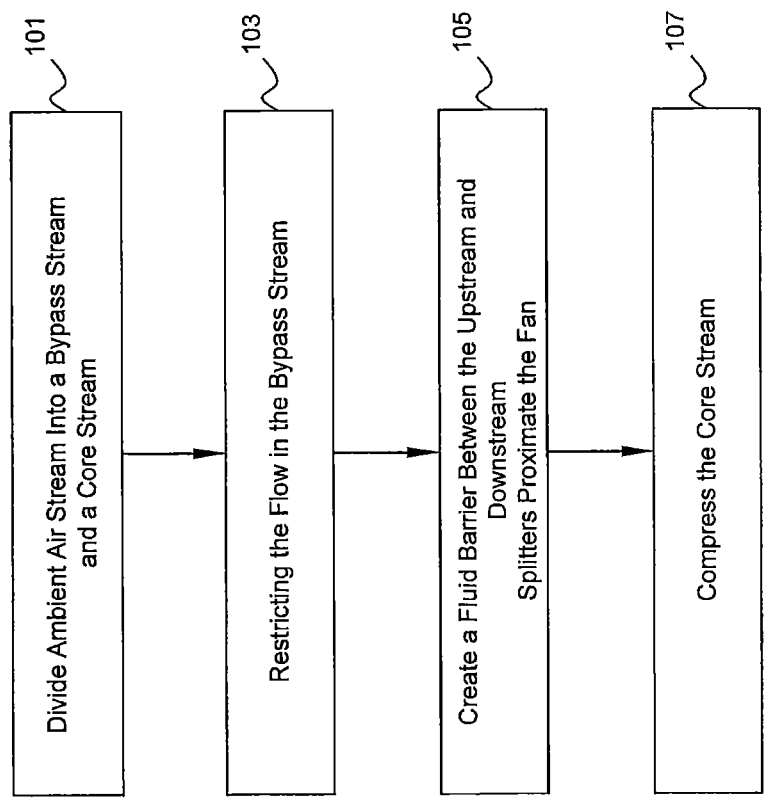
FIG. 10 is a flow chart of a method of preventing pressure leakage.

FIG. 10 shows a flow chart of a method of reducing the work performed on the bypass stream 30, while preventing a pressure drop in the core stream 28. The ambient air stream is divided into a bypass stream and a core stream as shown in block 101. It is not uncommon for the ambient air stream to be divided into multiple bypass or core streams, and the method is equally applicable in those instances, and thus is not so limited to the examples shown. In block 103, the flow in the bypass stream in restricted. Typically this will be through the use of inlet guide vanes 15 as shown in FIG. 1B and described above. The flow may also be restricted by completely or partially closing off the bypass duct or ducts. The step of restricting the bypass flow may be accomplished prior to, contemporaneously or subsequent to the step of dividing the streams.

A fluid barrier 51 is then created between the upstream and downstream splitters proximate the fan to prevent leakage and pressure loss from the core duct to the lower pressure bypass duct as shown in block 105. As discussed above, the fluid barrier 51 may be established through jets 60 on the low pressure side of the blade as shown in FIG. 3, jets 60 originating from the upstream splitter 25 as shown in FIG. 4. The fluid barrier 51 may also be established through the use of vortices, from the splitter 24 as shown in FIGS. 7a-8d, or vortices created from vane 82 or gap 83 by the fan 42 as shown in FIGS. 9a-9b. The core stream is compressed by the fan, without the leakage into the bypass duct as shown in block 107, and work on the bypass field by the fan is thus reduced by minimizing pressure leakage and restricting the amount of mass flow in the bypass stream.

While preferred embodiments of the present invention have been described, it is to be understood that the embodiments described are illustrative only and that the scope of the invention is to be defined solely by the appended claims when accorded a full range of equivalence. Many variations and modifications naturally occurring to those of skill in the art from a perusal hereof.

What I claim is:

1. A turbofan engine having a fan portion in fluid communication with a core stream and a bypass stream of air; the core stream being:
    compressed by the fan portion and a core compressor portion, heated and expanded through a core turbine portion;
    the core turbine portion driving the fan portion and the compressor portion; the core turbine portion connected to a shaft;
    the bypass stream being compressed by the fan portion;
    the core and the bypass streams separated by an upstream splitter and a downstream splitter with the fan portion disposed axially between the upstream and downstream splitters wherein a fluid passage between the core and bypass streams is defined between the splitters; the fan portion having a plurality of blades; each of the blades of the fan portion having a high pressure side and a low pressure side; and
    a plurality of high pressure fluid jets originating from the low pressure side of the blades restricting the migration of the core stream into the bypass stream through the fluid passage.

2. The turbofan engine of claim 1, wherein the high pressure fluid jets originate from orifices on the low pressure side of the blades.

3. The turbofan engine of claim 2, further comprising a plurality of passages supplying high pressure compressed air to the high pressure fluid jets.

4. The turbofan engine of claim 3, wherein the plurality of passages are in fluid communication with the core compressor portion.

5. The turbofan engine of claim 1, wherein the pressure of the core stream is greater than the pressure of the bypass stream.

6. The turbofan engine of claim 2, wherein the plurality of orifices are radially proximate to the upstream and downstream splitters.

7. The turbofan engine of claim 1, further comprising a third splitter and said fan portion comprises a first and second fan, said first fan positioned between the upstream splitter and the third splitter and the second fan positioned between the third splitter and the downstream splitter.

8. The turbofan engine of claim 6, wherein the plurality of orifices extend between a trailing edge of the upstream splitter and a leading edge of the downstream splitter.

9. The turbofan engine of claim 1, further comprising a plurality of variable angle inlet guide vanes positioned proximate to the upstream splitter inhibiting the bypass stream.

10. A method of preventing pressure leakage from a core stream in a high bypass turbojet engine, comprising:
    dividing an ambient air stream into a bypass stream and a core stream with a upstream splitter;
    compressing the bypass and core streams with a fan, said fan between the upstream splitter and a downstream splitter dividing the bypass and core streams downstream of the fan; wherein the core stream has a higher pressure than the bypass stream; and
    injecting a plurality of high pressure fluid jets from a low pressure side of the fan proximate the upstream and downstream splitters, said plurality of high pressure fluid jets having a directional component in a substantial opposite direction of the local velocity of the fan proximate the splitters thereby preventing pressure leakage across the fluid jets into the bypass stream.

11. The method of claim 10, further comprising restricting the bypass stream upstream of the of the fan.

12. The method of claim 11, wherein the step of restricting the bypass stream comprises rotating inlet guide vanes in the bypass stream, proximate the upstream splitter.

13. The method of claim 10, wherein the step of injecting a plurality of high pressure fluid jets comprises increasing the momentum of a fluid above the momentum of the core stream proximate the downstream splitter.

14. A turbofan engine comprising:
    a core duct defining a portion of a core fluid path;
    a bypass duct defining a portion of a bypass fluid path, the bypass duct concentric with the core duct and radially displaced from the core duct;
    a upstream splitter defining an annular first border portion between the core duct and the bypass duct;
    a downstream splitter defining an annular second border portion between the core duct and the bypass duct;
    a border region extending between a trailing edge of the upstream splitter and a leading edge of the downstream splitter;
    a plurality of fan blades rotating through the core duct, the bypass duct, and the border region about an axis concentric with the core and bypass ducts, each of the plurality of fan blades having a high pressure side and a low pressure side; and each of the plurality of fan blades comprise a plurality of high pressure ports positioned on the low pressure side proximate the border region; the plurality of high pressure ports connected to a high pressure fluid source by passages within each of the fan blades; and wherein the ports are configured to inject high speed fluid streams tangentially into the border region.

15. The turbofan engine of claim 14, further comprising a compressor, a combustor and a turbine along the core fluid path downstream of the downstream splitter.

16. The turbofan engine of claim 14, further comprising a plurality of inlet guide vanes in the bypass duct upstream of the plurality of fan blades, wherein the plurality of inlet guide vanes are selectively rotatable about the radial direction.

17. The turbofan engine of claim 15, wherein the passages are in fluid communication with the compressor.

18. The turbofan engine of claim 14, wherein a pressure of the core duct is greater than the pressure of the bypass duct at the border region.

19. The turbofan engine of claim 14, further comprising a third border portion and said plurality of fan blades comprises a first and second fan, said first fan positioned between the first border portion and the third border portion and the second fan positioned between the third border portion and the second border portion.

* * * * *